United States Patent

[11] 3,634,160

[72] Inventors: Johannes van Esdonk;
Godefridus Henricus Broers, both of
Emmasingel, Eindhoven, Netherlands
[21] Appl. No.: 856,627
[22] Filed: Sept. 10, 1969
[45] Patented: Jan. 11, 1972
[73] Assignee: U.S. Philips Corporation
New York, N.Y.
[32] Priority: Sept. 14, 1968
[33] Netherlands
[31] 6813191

[54] METHOD OF MANUFACTURING AN ELECTRODE
4 Claims, 1 Drawing Fig.

[52] U.S. Cl. .................................................. 156/3,
29/25, 29/14, 29/25.18
[51] Int. Cl. ...................................................... B23p 1/08

[50] Field of Search ........................................... 29/25.18,
25.17, 25.14, 472.3, 502, 471.3, 630; 219/145;
156/3

[56] References Cited

UNITED STATES PATENTS

| 3,055,098 | 9/1962 | Bratkowski et al. | 29/502 |
| 3,200,231 | 8/1965 | Bejat | 219/69 E |

OTHER REFERENCES

Neus aus der Technik (No. 5) Sept. 1966, pp. 1– 3

Primary Examiner—Robert F. Burnett
Assistant Examiner—R. J. Roche
Attorney—Frank R. Trifari ABSTRACT: An electrode for making parallel slots in metal plates by spark erosion is formed by tantalum strips separated by spacing layers of molybdenum. The layers are soldered by silver. The molybdenum and silver are then etched away over a given distance so that only the tantalum electrodes protrude.

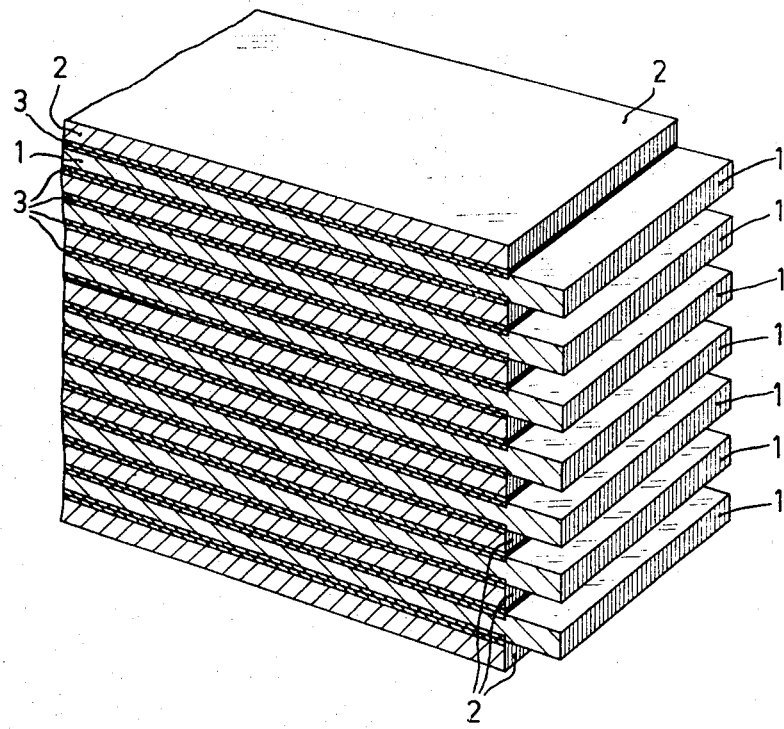

METHOD OF MANUFACTURING AN ELECTRODE

The invention relates to a method of manufacturing an electrode unit for use in making a plurality of accurately spaced apertures, of accurately defined dimensions, in a metal plate by spark erosion. The electrodes are formed with spacing intermediate layers into a set which is heated and then mechanically machined. A portion of the intermediate layers are then removed by etching to a given depth. The invention is specifically directed to such an electrode unit for making a plurality of parallel slits in a metal plate.

From "Neues aus der Technik" of Sept. 1st 1966, page 4, it is known to wind a silver-coated tungsten wire on a core, the thickness of the silver layer determining the electrode spacing. The assembly is heated in a reducing atmosphere at 800° C. until the silver layers are interconnected by diffusion, after which the assembly is sawed through and the silver is removed over a given distance by etching. The projecting ends of the tungsten wire on a core, the thickness of the silver layer determining the electrode spacing. The assembly is heated in a reducing atmosphere at 800° C. until the silver layers are interconnected by diffusion, after which the assembly is sawed through and the silver is removed over a given distance by etching. The projecting ends of the tungsten wire form the electrodes which can be used to produce a great number of apertures simultaneously in a metal plate by spark erosion.

However, tungsten is less suitable as spark electrode material than tantalum. Because the intermediate silver layers would dissolve in the tantalum and the distance between the electrodes would change, the known method, described above, cannot be used to form electrodes of tantalum.

It has, however, been found that this method can be used to make electrodes of tantalum if, the tantalum electrodes are stacked with the interposition of intermediate molybdenum layers and a layer of silver between the tantalum and molybdenum. The stacked construction can then be heated in an inert atmosphere under pressure until the silver melts and completely penetrates into the pores of the electrodes and the intermediate layers thus interconnecting them so that the distance between the electrodes is solely determined by the thickness of the intermediate molybdenum layers.

It is necessary that the heating be carried out in vacuum or in an inert atmosphere, since when heated in hydrogen, tantalum is pulverized. The silver layer is applied in the form of a foil. The excess quantity of silver is laterally pressed away from between the electrodes during the heating process. As an alternative tantalum bars or strips may be used which are held apart by silver-coated molybdenum strips. Since upon heating the silver penetrates into the pores of the tantalum electrodes and the molybdenum strips and the excess quantity is pressed away laterally, the thickness of the molybdenum layers has to correspond to the desired distance between the tantalum electrodes. The silver layers serve for soldering together the electrodes and the intermediate layers, so that a satisfactory adhesion is obtained between there parts. During etching the silver is removed from the silver-containing tantalum surface so that it will not adversely affect the properties of the tantalum as spark electrode material.

After soldering the set is milled or sawed and the molybdenum of the intermediate layers is removed over a given distance by etching with a nitric acid—sulphuric acid mixture, which is commonly used for dissolving molybdenum. It is found that the silver is then also dissolved from the tantalum surface.

The invention will now be described more fully with reference to the drawing, the FIGURE of which is a perspective view of the electrode unit after the intermediate layers have been partly etched away.

Referring to the FIG. 1 designates the tantalum electrodes in the form of strips and 2 designates the intermediate molybdenum layers. The silver layers 3 have completely penetrated into the pores of the electrodes 1 and the intermediate layers 2 and are therefore no longer present as such. The distance between the electrodes 1 is therefore solely determined, by the thickness of the molybdenum layers 2.

By means of this electrode unit a slotted grating can be made in a metal plate by spark erosion. It should be noted that the dimensions of each opening are enlarged all around by about 5μ as compared with the cross section of each electrode 1.

What is claimed is:

1. A method of manufacturing an electrode unit intended for use in forming slots by spark erosion techniques comprising the steps of stacking a plurality of tantalum electrode members in spaced parallel relationship with an intermediate layer of molybdenum between each of said electrode members, interposing a layer of silver foil between each electrode member and intermediate layer, placing said stack in an inert atmosphere, heating said stack within said inert atmosphere so as to melt the silver and allow it to penetrate the pores of the electrode members and the intermediate layer thereby forming a connection therebetween, etching to remove a portion of each of said intermediate layers to a given depth from one edge of the stack so that the electrode members protrude to thereby form the electrode unit.

2. The method of manufacturing an electrode unit according to claim 1 wherein said etching is carried out with a mixture of nitric acid and sulfuric acids.

3. The method of manufacturing an electrode unit according to claim 1 further comprising the additional step of pressing the excess silver after heating from between the electrode members and intermediate layers so that the distance between electrode members is solely equal to the thickness of the intermediate layer.

4. The method of manufacturing an electrode unit according to claim 1 wherein said inert atmosphere is under pressure.

* * * * *